United States Patent [19]
Starkweather

[11] Patent Number: 4,475,787
[45] Date of Patent: Oct. 9, 1984

[54] SINGLE FACET WOBBLE FREE SCANNER

[75] Inventor: Gary K. Starkweather, Saratoga, Calif.

[73] Assignee: Xerox Corporation, Stamford, Conn.

[21] Appl. No.: 422,783

[22] Filed: Sep. 24, 1982

Related U.S. Application Data

[63] Continuation-in-part of Ser. No. 232,109, Feb. 6, 1981, abandoned.

[51] Int. Cl.³ .............................................. G02B 27/17
[52] U.S. Cl. ...................................... 350/6.4; 350/6.5
[58] Field of Search .................. 350/6.4, 6.5, 6.6, 6.7, 350/6.9, 486, 485, 286, 287; 250/236, 235; 356/138, 143; 372/15, 16

[56] References Cited
U.S. PATENT DOCUMENTS

| | | | |
|---|---|---|---|
| 3,315,177 | 4/1967 | Benson | 372/15 |
| 3,471,234 | 10/1969 | Studebaker | 356/138 |
| 3,845,298 | 10/1974 | Runciman | 250/236 |
| 3,875,587 | 4/1975 | Pugsley | 350/6.4 |
| 3,995,230 | 11/1976 | See | 372/16 |
| 4,084,092 | 4/1978 | Runciman | 350/6.8 |
| 4,297,031 | 10/1981 | Hamar | 350/287 |

FOREIGN PATENT DOCUMENTS

| | | | |
|---|---|---|---|
| 2121918 | 11/1972 | Fed. Rep. of Germany | 350/6.4 |
| 281910 | 8/1975 | U.S.S.R. | 350/6.4 |

*Primary Examiner*—Joan W. Henry
*Attorney, Agent, or Firm*—Franklyn C. Weiss

[57] ABSTRACT

A single facet wobble free light scanner which eliminates the effects of wobble caused by bearing inaccuracies or other mechanical factors. A pentaprism, pantamirror, right angle prism or right angle mirror monogon 30 is rotated about an axis passing through its sides and through the axis of the applied light beam 8. By reflections off of two mirrored surfaces 22, 24, the output light beam 28 creates a plane of light. When, or if, the pentaprism 30 wobbles about the rotational axis, the effects of the wobble are eliminated because via the internal reflections of the pentaprism, the output light beam 28a is parallel to the original output light beam 28, the parallel light beams 28, 28a being focused onto the scan surface by external optics 70.

3 Claims, 8 Drawing Figures

SINGLE FACET WOBBLE FREE SCANNER

This is a continuation-in-part of application Ser. No. 232,109, filed Feb. 6, 1981, and now abandoned.

The invention relates to a single facet wobble free scanner which eliminates the effect of wobble caused by bearing inaccuracies or other mechanical factors. By rotating a pentaprism around the axis of the applied light and through its sides, the output parallel light beams can be focussed at the desired scan plane.

BACKGROUND OF THE INVENTION

In facsimile, character recognition and other type scanning systems, the optical scanner accuracy is of considerable importance. The more accurate the scanner apparatus the higher the bit rate can be with increased efficiency. Motor bearings, gear teeth, etc., must be accurately machined in order to ensure that the scanning apparatus is usable at the resolution desired. Further, slight weight discrepancies of the bearings, gear teeth, etc., in addition to the moving optical material, could also cause wobble or other vibration effects which detract from the efficient and accurate operation of the scan mechanism.

One prior art solution to this problem is seen in U.S. Pat. No. 4,002,830, issued Jan. 11, 1977. A reflecting mirror which is adjustable through all three axes via an electrical feedback system, corrects for facet to facet differences in a rotating polygonal mirror optical scanning system.

According to the present invention, a pentaprism monogon is rotated about an axis passing through its sides and through the axis of the applied light. Any wobble-inducing inaccuracies in the motor bearings, support, or drive mechanics are ineffective in causing any perturbation in the scanning light beam. The use of a pentaprism permits the scan to be virtually wobble free since rotation of a pentaprism about an axis passing through its sides (non-reflecting faces) does not cause beam reflectance angular changes. That is, the output light beams are in parallel and can be focussed by a postprism lens at the focal point of the lens which is made coincident with the scan plane. The present invention, therefore, permits a significantly simpler and more cost effective scanning technique.

DESCRIPTION OF THE DRAWINGS

For a more complete understanding of the invention, as well as other features thereof, reference may be had to the following detailed description of the invention in conjunction with the drawings wherein:

FIGS. 1A and 1B show the prior art type of rotating mirrors 10 used in light scanning systems with FIG. 1B showing the effects of wobble on the output beam. In FIG. 1A the impinging light 8 could be the output from a laser. It could also be from any other light source if focussed to appear on the plane of the mirror. Also, the input light could be modulated if used in a printing system or unmodulated if used in an input scanning system. The input light 8 reflects off of the diagonal surface of mirror 10. This diagonal surface could be caused by joining two right angle prisms together with a mirrored surface formed on one of the hypotenuse surfaces of one of the prisms in the prior art manner. When the mirror 10 is rotated (by means not shown) about an axis through the axis of the input impinging light source, the reflected light 12 also rotates about the axis of rotation and defines a plane of light which would be perpendicular to the surface of the paper on which the drawing is made.

FIG. 1B shows the effect of wobble on the light beam as caused by defects or inaccuracies in the drive mechanism, as set forth previously. The original position of the mirror monogon 10 is seen, the same as set forth in FIG. 1A. However, dotted lines 10a show, grossly exaggerated for detail, mirror 10 in a displaced position which could occur from the above-mentioned drive mechanism inaccuracies. In the original position, the input light 8 reflects off of mirror 10 to form light beam 12. When mirror 10 wobbles, however, as seen by dotted lines 10a, the input light beam 8 is caused to deviate away from the plane of the light described above in conjunction with FIG. 1A, and seen as light beam 12a. The greater the amount of wobble, the greater the amount of deviation from the desired plane of light as wobble increases, of course, the scanning system becomes increasingly inaccurate and less reliable.

FIG. 2A shows the same scanning system, but utilizes an internally reflected pentaprism 30 instead of the external reflected mirror in FIGS. 1A and 1B. The same light beam would impinge on upper surface 20 of the pentaprism 30. If surface 20 is not mirrored or silvered, most of the light will enter the pentaprism 30 and reflect off of surface 22 which is mirrored so as to cause most of the light to be internally reflected. With the angle of incidence equalling the angle of reflectance, the light is reflected now off of internal surface 24 which is also mirrored so that it, too, reflects most of the light impinging upon it. This light beam 28 passes out of surface 26 of the pentaprism, the surface 26 not being mirrored. If the pentaprism 30 is rotated about an axis through the axis of the input inpinging light source, a similar plane of light perpendicular to the surface of the page of the drawing is created.

Figure 1A:
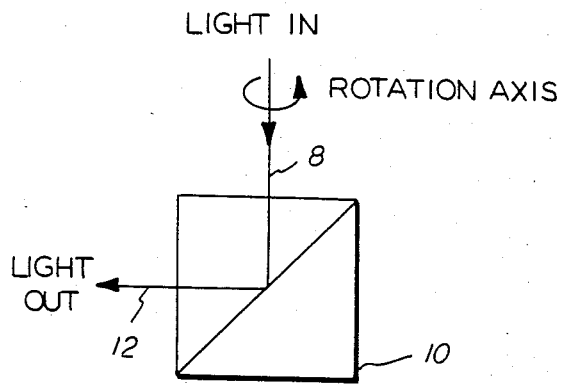
FIG. 1A is a side view schematic representation of a beam splitter monogon that is bearing sensitive.
Figure 1B:
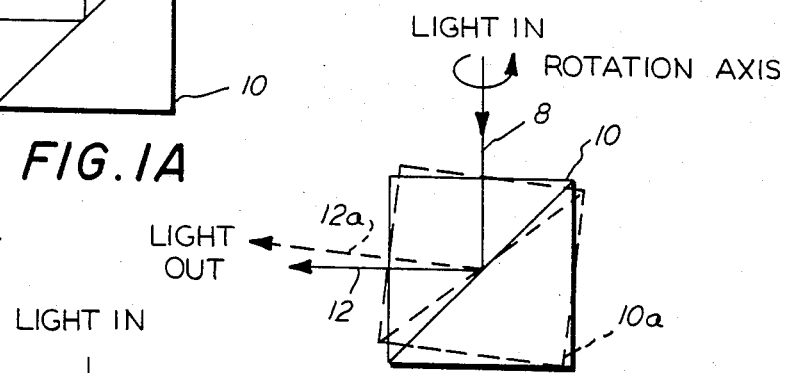
FIG. 1B is a side view schematic representation of a beam splitter monogon that is bearing sensitive and is affected by wobble.
Figure 2A:
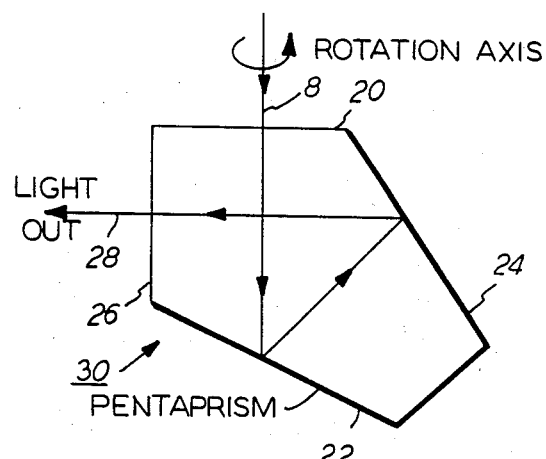
FIG. 2A is a side view schematic representation of a pentaprism monogon that is bearing insensitive.
Figure 2B:
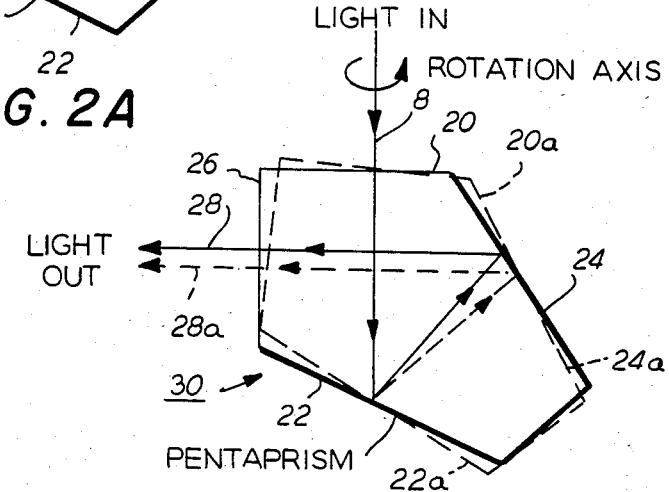
FIG. 2B is a side view schematic representation of a pentaprism monogon that is bearing insensitive and unaffected by wobble.

When, or if, the pentaprism 30 wobbles, as seen in FIG. 2B, the effect of the wobble is completely different. The input light 8 impinges on the pentaprism 30 also seen in a wobbled position by the dotted lines. The light reflects off of surface 22a, and also then reflects off of surface 24a. But now, with the same principle of the angle of incidence equalling the angle of reflectance, the output light beam 28a creates a plane of light parallel to that of the original plane of light. The light is not reflected off at a divergent angle, but the same angle, just displaced slightly in a parallel plane. Subsequent optic and lens arrangements would focus the beam onto the scanned surface such that no effect of the wobble would be discernible. Of course, the wobble effect in FIG. 2B is also grossly exaggerated for detail.

Figures 3A, 3B, 3C:
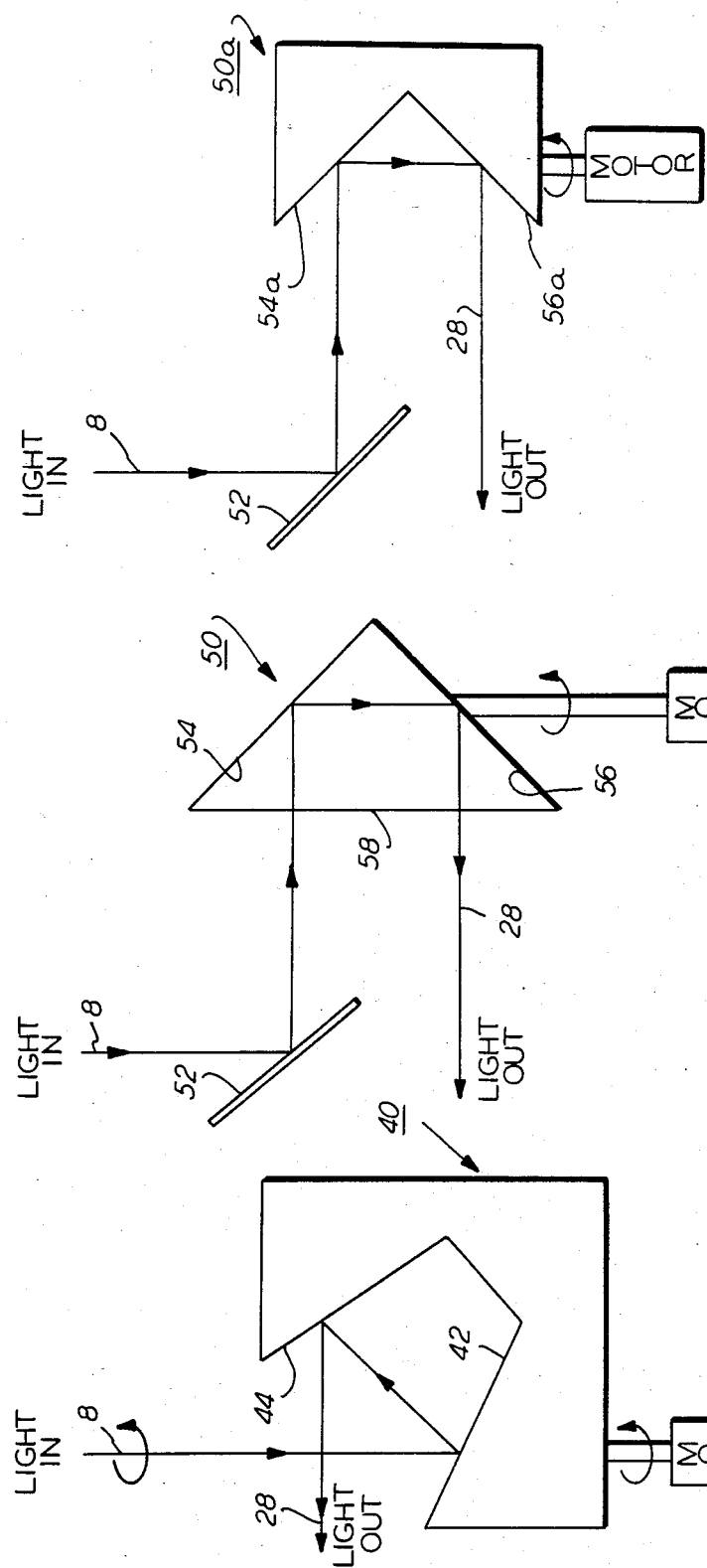
FIG. 3A is a side view schematic representation of a pentamirror similar to the pentaprism in FIG. 2A.
FIG. 3B is a side view schematic representation of a right angle prism that is bearing insensitive and unaffected by wobble.
FIG. 3C is a side view schematic representation of a right angle mirror that is bearing insensitive and unaffected by wobble.

Alternatively, the pentaprism 30 could be replaced with mirror equivalents. That is, internally reflected surfaces of the pentaprism 30 could be replaced by a pentamirror configuration as seen in FIG. 3A. The mirror surfaces of the pentamirror 40 could be constructed at the same angles as a pentaprism such that an input light beam 8 would scan in a similar manner with effects of inherent wobble eliminated. Thus, in FIG. 3A, the input light beam, similar to light 8 in the earlier figures, is aimed toward surface 42 of pentamirror apparatus 40. An external reflection, similar to internal reflection off of surface 22 of the pentaprism 30 in FIG. 3, would occur towards surface 44 of pentamirror 40. The light out 28 would also define a plane perpendicular to the pate of the drawing when the mirror is rotated about the axis of the applied input light 8. Any wobble effects on the light would be similarly treated by pentamirror 40 as for the pentaprism 30 seen in FIG. 2B.

Still further embodiments can be seen in FIGS. 3B and 3C. Mirror 52 could be used to direct the input light toward the rotating mirror assembly 50. This mirror assembly would include a right angle prism which are externally coated on faces 54 and 56 for internal reflection. The light reflected from mirror 52 would impinge face 58 of the mirror 50 perpendicularly thereto to minimize reflection at this face. Then the light internally reflects off of face 54 at right angles to face 56 where the light reflects out at the opposite direction therefrom. If the mirror is rotated about an axis parallel to the light directed at mirror 52, a plane of light is generated similar to the embodiments discussed above. Due to the angles of incidence and reflection, both internal and external, the wobble effects are similarly eliminated.

FIG. 3C shows a mirror assembly similar to that of FIG. 3B but utilizes the same attributes of FIG. 3A. Here, the mirror surfaces 54a and 56a are utilized at right angles rather than the right angle prism of FIG. 3B. Similar effects of wobble due to rotation imperfection are eliminated.

Figure 4:
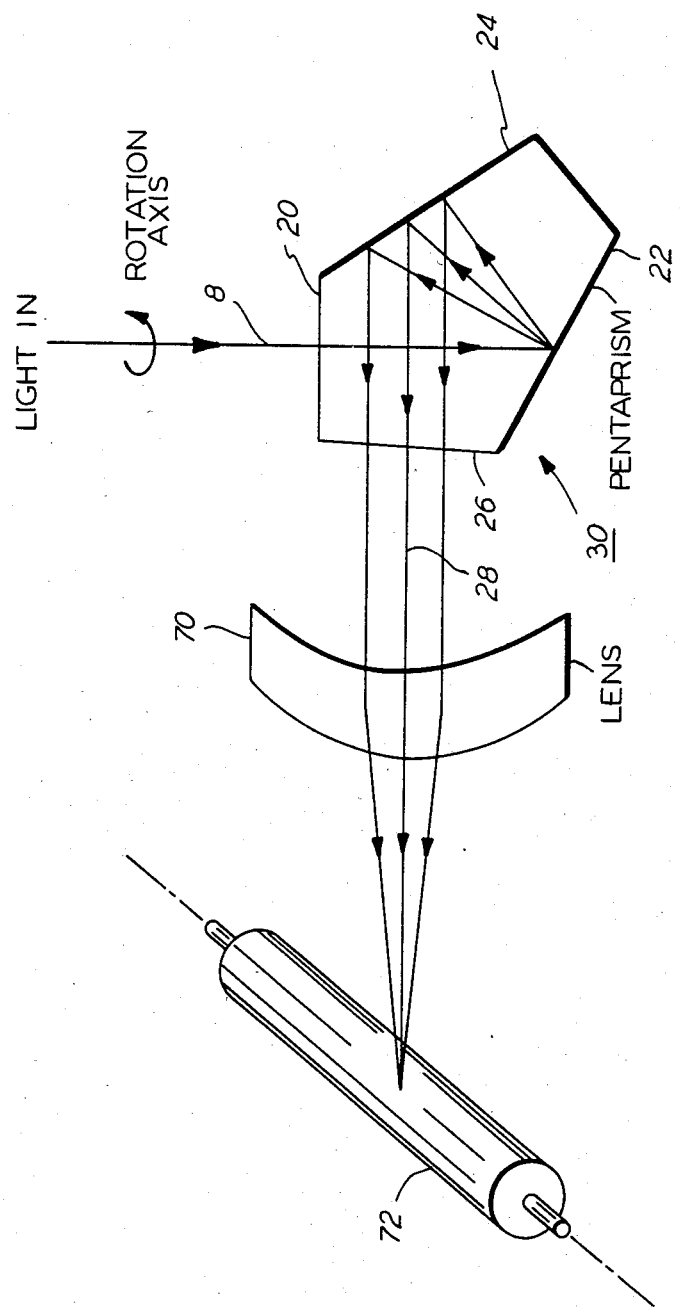
FIG. 4 is a side view and part isometric view of a scanning system utilizing the principles of the present invention.

FIG. 4 shows the pentaprism 30 with the output lens 70 and the medium to be scanned as alluded to in conjunction with FIGS. 2A and 2B. The medium scanned is shown as a drum which could carry a document to be scanned in an input information mode or a photosensitive drum in an output information mode. However, the medium scanned does not have to be a drum at all but a plane upon which the scan line is focussed. Thus, light beam 8 is directed at surface 20 and exits from the pentaprism via surface 26, as set forth in FIG. 2. If there were any wobbles during the rotation of the pentaprism 30, the output light beams 28 would define parallel planes due to the rotation of the pentaprism. Lens 20 would focus these parallel light beams to a single line at the focal point of the lens which is part of the scan plane. Thus the focal plane and scan planes are coincident.

Lens 70 is shown schematically in that it depends on the shape of the spot of light being scanned and the distances between the elements shown in FIG. 4. If, for example, the spot size is desired to be circular, then a lens with a spherical prescription could be chosen. If an oval or elongated spot size is desired, then a cylindrical or even toric lens prescription could be implemented. Normally, a circular spot is desired and a single or compound lens array could be used within the confines of size, distance, etc., of the scan line and components themselves.

While the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

What is claimed is:

1. A single facet wobble free light scanner (30) which effectively eliminates the effects of wobble caused by mechanical or other factors including a pentaprism being rotated about an axis passing through its sides and through the axis of the applied light beam (8), wherein the improvement is characterized by:

said pentaprism being positioned such that said light beam (8) enters through a first unmirrored surface (20), passes through the body of said pentaprism to a second mirrored surface (22) which internally reflects said light beam across the body of said pentaprism to a third proximate and mirrored surface (24) which internally reflects said light beam across the path of said light beam as it entered the pentaprism at the first surface (20) and exits said pentaprism at a fourth unmirrored surface (26) of said pentaprism, wherein said output light beam (28) defines a light plane perpendicular to said axis of the applied light beam (8) as said pentaprism is rotated, the angles of incidence equalling the angles of reflection within said pentaprism such that when and if wobble is introduced to said pentaprism monogon as it rotates, the output light beam (28a) defines parallel planes within the range of the introduced wobble, and lens means in the path of said output light beam (28) for focussing the parallel planes of said light beam (28) to a fine point of light defining a scan line essentially devoid of any effects of said wobble.

2. A light scanner which eliminates the effects of wobble caused by mechanical or other factors including a mirror assembly rotated about an axis passing through its sides, wherein the improvement is characterized by:

said mirror assembly (30) comprising a pentaprism wherein the light enters through a first unmirrored surface (20), passes through the body of the pentaprism to a second mirrored surface (22) which internally reflects the light beam across the body of said pentaprism to a third proximate and mirrored surface (24) which internally reflects said light beam across the path of said light beam as it entered the pentaprism at the first surface (20) and exits said pentaprism at a fourth unmirrored surface (26) of said pentaprism, and lens means in the path of said light beam (28) from said assembly (30) for focussing the light to a fine point of light defining a scan line essentially devoid of any effects of said wobble, said light beam (28) defining a light plane perpendicular to the axis of rotation of said mirror assembly, the angles of incidence equalling the angles of reflection in relation to said mirror assembly such that when and if wobble is introduced to said mirror assembly as it rotates, the light beam (28) defining parallel planes within the range of the introduced wobble.

3. A light scanner which eliminates the effects of wobble caused by mechanical or other factors including a mirror assembly rotated about an axis passing through its sides, wherein the improvement is characterized by:

said mirror assembly (40) comprising a pentamirror cavity configuration with only three of the five surfaces of the pentamirrors present, wherein the light is directed to a first mirrored surface (42) which externally reflects the light beam across the cavity of said pentamirror to a second mirrored surface (44) which externally reflects said light beam across the pentamirror cavity and the path of said light beam as it was directed to said first mirrored surface (42) and exits said pentamirror cavity, and lens means in the path of said light beam (28) from said assembly for focussing the light to a fine point of light defining a scan line essentially devoid of any effects of said wobble, said light beam (28) defining a light plane perpendicular to the axis of rotation of said mirror assembly, the angles of incidence equalling the angles of reflection in relation to said mirror assembly such that when and if wobble is introduced to said mirror assembly as it rotates, the light beam (28), defines parallel planes within the range of the introduced wobble.

* * * * *

REEXAMINATION CERTIFICATE (2532nd)
United States Patent [19]
Starkweather

[11] B1 4,475,787
[45] Certificate Issued Apr. 11, 1995

[54] SINGLE FACET WOBBLE FREE SCANNER

[75] Inventor: Gary K. Starkweather, Saratoga, Calif.

[73] Assignee: Xerox Corporation, Stamford, Conn.

Reexamination Request:
No. 90/003,456, Jun. 6, 1994

Reexamination Certificate for:
Patent No.: 4,475,787
Issued: Oct. 9, 1984
Appl. No.: 422,783
Filed: Sep. 24, 1982

Related U.S. Application Data

[63] Continuation-in-part of Ser. No. 232,109, Feb. 6, 1981, abandoned.

[51] Int. Cl.⁶ .................. G02B 26/10; G02B 27/17
[52] U.S. Cl. ................................. 359/211; 359/212
[58] Field of Search ............................... 359/205–207, 359/209, 211–213, 216, 220, 222, 223, 226, 662, 833, 834–837; 250/235, 236; 372/15, 16

[56] References Cited

U.S. PATENT DOCUMENTS

| | | |
|---|---|---|
| 1,746,407 | 2/1930 | Schroter et al. |
| 2,478,555 | 8/1949 | Yule |
| 2,758,502 | 8/1956 | Scott et al. |
| 3,424,516 | 5/1964 | Snyder, III |
| 3,426,294 | 2/1969 | Koester |
| 3,573,849 | 4/1971 | Herroit et al. |
| 3,684,381 | 8/1972 | Zoot |
| 3,771,876 | 11/1973 | Ljungdahl et al. |
| 3,845,298 | 10/1974 | Runciman |
| 3,875,587 | 4/1975 | Pugsley |
| 3,897,132 | 7/1975 | Meeussen et al. |
| 3,973,825 | 8/1976 | Starkweather |
| 4,002,830 | 1/1977 | Brown et al. |
| 4,019,804 | 4/1977 | Collier |
| 4,082,416 | 4/1978 | Runciman et al. |
| 4,213,157 | 7/1980 | DeBenedictis et al. |
| 4,297,031 | 10/1981 | Hamar |
| 4,483,618 | 11/1984 | Hamar |

FOREIGN PATENT DOCUMENTS

| | | |
|---|---|---|
| 1185115 | 3/1970 | United Kingdom |
| 1232962 | 5/1971 | United Kingdom |

OTHER PUBLICATIONS

"Recorders: flat vs cylindrical", Hartfield, Laser Focus, Apr. 1973, pp. 47–49.

Urbach, et al.; "Laser Scanning for Electronic Printing"; Proceedings of the IEEE, vol. 70, No. 6, Jun. 1982, pp. 597–618.

Beiser, "Laser Scanning Systems" in Laser Applications, vol. 2, Mr. Ross Ed., New York: Academic Press, 1974, pp. 53–159.

Primary Examiner—Loha Ben

[57] ABSTRACT

A single facet wobble free light scanner which eliminates the effects of wobble caused by bearing inaccuracies or other mechanical factors. A pentaprism, pantamirror, right angle prism or right angle mirror monogon 30 is rotated about an axis passing through its sides and through the axis of the applied light beam 8. By reflections off of two mirrored surfaces 22, 24, the output light beam 28 creates a plane of light. When, or if, the pentaprism 30 wobbles about the rotational axis, the effects of the wobble are eliminated because via the internal reflections of the pentaprism, the output light beam 28a is parallel to the original output light beam 28, the parallel light beams 28, 28a being focused onto the scan surface by external optics 70.

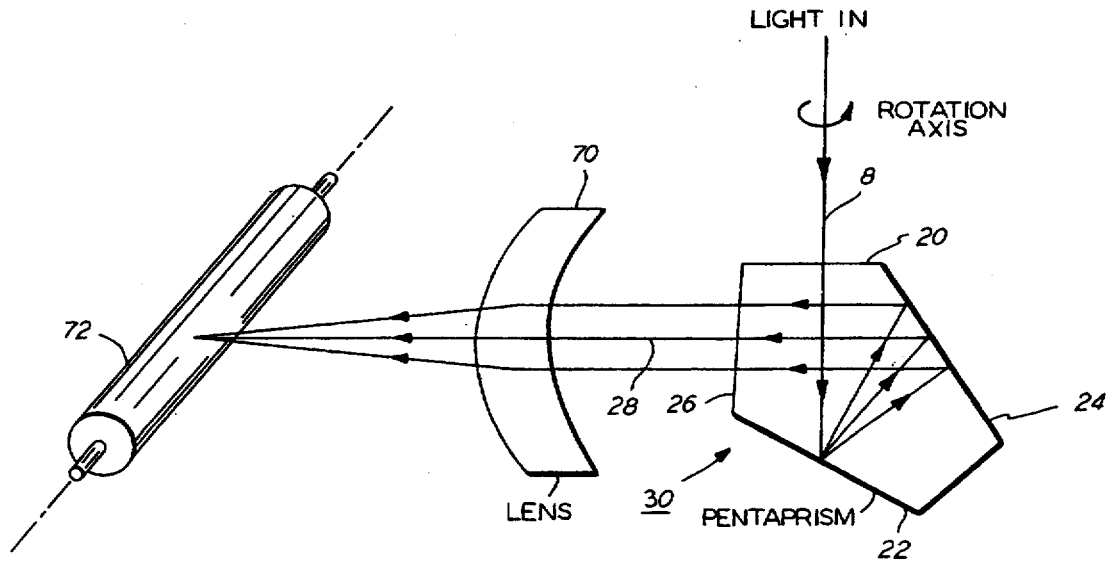

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1, 2 and 3 is confirmed.

* * * * *